United States Patent
Gangi

(10) Patent No.: US 7,349,885 B2
(45) Date of Patent: Mar. 25, 2008

(54) WALLET CONSOLIDATOR AND RELATED METHODS OF PROCESSING A TRANSACTION USING A WALLET CONSOLIDATOR

(75) Inventor: Frank J. Gangi, Frisco, TX (US)

(73) Assignee: E-Micro Corporation, Frisco, TX (US)

( * ) Notice: Subject to any disclaimer, the term of this patent is extended or adjusted under 35 U.S.C. 154(b) by 1509 days.

(21) Appl. No.: 09/923,617

(22) Filed: Aug. 6, 2001

(65) Prior Publication Data

US 2001/0045454 A1    Nov. 29, 2001

Related U.S. Application Data

(63) Continuation of application No. 09/618,407, filed on Jul. 18, 2000, now Pat. No. 6,293,462, which is a continuation of application No. 09/087,193, filed on May 29, 1998, now Pat. No. 6,131,811.

(51) Int. Cl.
*G06Q 40/00* (2006.01)
*G06Q 10/00* (2006.01)
*G06K 5/00* (2006.01)

(52) U.S. Cl. .......................... 705/41; 705/1; 235/380; 235/382

(58) Field of Classification Search ............. 705/1, 705/41, 69; 235/380, 382, 379, 370; 361/708, 361/683
See application file for complete search history.

(56) References Cited

U.S. PATENT DOCUMENTS 4,701,601 A    10/1987 Francini et al.
(Continued)

FOREIGN PATENT DOCUMENTS

DE    100 50 882 A1    5/2002
(Continued)

OTHER PUBLICATIONS

Towitoko Electronics, "Product Overview Smartcard Terminals & Systems", Feb.
(Continued)

*Primary Examiner*—Ella Colbert
(74) *Attorney, Agent, or Firm*—Bracewell & Giuliani LLP

(57) ABSTRACT

A wallet consolidator to process a transaction and related methods, are provided. An embodiment of a wallet consolidator can include a controller to control operation of the wallet consolidator, and an input device connected to the controller and positioned to receive a copy of information. The input device, for example, can include a magnetic stripe reader/writer for reading and writing magnetic stripes, a bar code scanner for scanning bar codes, or a keypad, among others, to input user selections and commands. An embodiment of a wallet consolidator can also include a memory for storing information provided to the wallet consolidator, and an output device connected to the controller and positioned to transmit at least a portion of the information stored in the memory device to a computer device, e.g., point-of-sale terminal, dumb terminal, and/or database, located at a point-of-sale, to process a transaction. The output device can include a wireline communications interface, a wireless communications interface, a radio frequency (RF) interface, or an infrared (IR) interface, among others.

35 Claims, 3 Drawing Sheets

U.S. PATENT DOCUMENTS

| | | | |
|---|---|---|---|
| 4,705,211 A | | 11/1987 | Honda et al. |
| 4,837,422 A | | 6/1989 | Dethloff et al. |
| 4,868,376 A | | 9/1989 | Lessin et al. |
| 5,095,196 A | | 3/1992 | Miyata |
| 5,135,095 A | | 8/1992 | Kocznar et al. |
| 5,191,193 A | * | 3/1993 | Le Roux .................... 235/379 |
| 5,221,838 A | * | 6/1993 | Gutman et al. ............. 235/379 |
| 5,276,311 A | | 1/1994 | Hennige |
| 5,578,808 A | * | 11/1996 | Taylor ........................ 235/380 |
| 5,585,787 A | | 12/1996 | Wallerstein |
| 5,649,118 A | * | 7/1997 | Carlisle et al. ................ 705/41 |
| 5,748,737 A | * | 5/1998 | Daggar ........................ 705/41 |
| 5,872,844 A | * | 2/1999 | Yacobi ........................ 705/69 |
| 5,895,903 A | | 4/1999 | Abe et al. |
| RE36,365 E | | 11/1999 | Levine et al. |
| 5,987,438 A | * | 11/1999 | Nakano et al. ............... 705/41 |
| 6,131,811 A | | 10/2000 | Gangi |
| 6,189,787 B1 | | 2/2001 | Dorf |
| 6,293,462 B1 | | 9/2001 | Gangi |
| 6,370,488 B1 | | 4/2002 | Beaudoin et al. |
| 6,402,029 B1 | | 6/2002 | Gangi |
| 6,473,500 B1 | | 10/2002 | Risafi et al. |
| 6,505,772 B1 | | 1/2003 | Mollett et al. |
| 6,685,088 B1 | | 2/2004 | Royer et al. |
| 6,820,199 B2 | | 11/2004 | Wheeler et al. |
| 6,981,154 B2 | | 12/2005 | Wheeler et al. |
| 7,083,087 B1 | | 8/2006 | Gangi |
| 2001/0048023 A1 | | 12/2001 | Fitzmaurice et al. |
| 2002/0112160 A2 | | 8/2002 | Wheeler et al. |
| 2002/0174014 A1 | | 11/2002 | Cuervo |
| 2003/0051145 A1 | | 3/2003 | Jackson et al. |
| 2003/0155416 A1 | | 8/2003 | Macklin et al. |
| 2003/0236747 A1 | | 12/2003 | Sager |
| 2005/0005117 A1 | | 1/2005 | Wheeler et al. |
| 2005/0005118 A1 | | 1/2005 | Wheeler et al. |
| 2005/0005123 A1 | | 1/2005 | Wheeler et al. |
| 2005/0005124 A1 | | 1/2005 | Wheeler et al. |
| 2005/0044373 A1 | | 2/2005 | Wheeler et al. |
| 2005/0267840 A1 | | 12/2005 | Holm-Blagg et al. |
| 2006/0036543 A1 | | 2/2006 | Blagg et al. |
| 2006/0169768 A1 | | 8/2006 | Gangi |

FOREIGN PATENT DOCUMENTS

| | | |
|---|---|---|
| EP | 0656600 | 6/1995 |
| EP | 0656600 A2 | 6/1995 |
| JP | 61253580 | 11/1986 |
| JP | 2004102784 | 4/2004 |
| WO | WO 98/10363 | 3/1998 |
| WO | WO 98/12675 | 3/1998 |
| WO | WO 01/29789 A1 | 4/2001 |
| WO | WO 01/61920 A1 | 8/2001 |
| WO | WO 01/88659 A1 | 11/2001 |
| WO | WO 2005/052871 A1 | 6/2005 |

OTHER PUBLICATIONS

Vedder, Dr. Klaus and Dr. Franz Weikmann, "Smart Cards—Requirements, Properties and Applications", 1998.

"ActivCard", ActivCard, Inc., 1998.

"Value-Checker CP", OKI Advanced Products, OKI America, Inc., 1998.

"Logismart Chipcard Readers—Worth Your Attention", Logis Chipcard Products, 1998.

"Setpurse", Sectec Oy, 1998.

"NURI Smart Card Solutions", NURI Information & Communication, Inc., 1998.

"Visa Smart", Visa U.S.A.

Towitoko Electronics, "Product Overview Smartcard Terminals & Systems", Feb. 1998.

Dr. Klaus Vedder and Dr. Franz Weikmann, Giesecke & Devrient, "Smart Cards—Requirements, Properties and Applications", 1998.

OKI Advanced Products, OKI America, Inc., "Value-Checker.TM. CP", 1998.

Logis Chipcard Products, "Logismart Chipcard Readers—Worth Your Attention", 1998.

Setec Oy, "Setpurse.TM.", 1998.

NURI Information & Communication Inc., "NURI Smart Card Solutions", 1998.

Visa U.S. S., "Visa® Smart".

* cited by examiner

WALLET CONSOLIDATOR AND RELATED METHODS OF PROCESSING A TRANSACTION USING A WALLET CONSOLIDATOR

RELATED APPLICATIONS

This application is a continuation of and claims priority to and the benefit of U.S. patent application Ser. No. 09/618,407, filed Jul. 18, 2000, titled "WALLET CONSOLIDATOR," now U.S. Pat. No. 6,293,462, which is a continuation of U.S. patent application Ser. No. 09/087,193, filed May 29, 1998, titled "WALLET CONSOLIDATOR," now U.S. Pat. No. 6,131,811.

BACKGROUND OF THE INVENTION

1. Field of the Invention

The present invention pertains in general to the use of electronic smart cards for the storage of information pertaining to electronic commerce and consumer identification, and in particular, but not by way of limitation, to a method and apparatus for the warehousing and retrieval of information pertaining to credit cards, debit cards, identification cards and other selected data.

2. Description of Related Art

In today's electronic commerce there has been a proliferation in the use of various types of credit, debit, identification and other types of authorization cards. For example, an average individual is likely to carry a driver's license, several credit and/or debit cards, an identification card for access to a health club, an identification card to gain access to a place of employment and an access card to gain entry into a parking garage, among others. Furthermore, with advances in electronic commerce, smart cards are likely to replace paper and coin money resulting in an additional card for consumers to carry. Each of these cards typically incorporates a magnetic stripe or bar code to facilitate easy recognition of the card and to store various types of data. Although the use of these cards allow for easy and efficient electronic commerce, the number of such cards quickly becomes cumbersome and many individuals find carrying the large number of cards inconvenient.

Attempts have been made to use a single smart card to hold the various information contained on several cards. These attempts, however, involve the downloading of information from the smart card provider and do not allow a smart card user to control the contents of the device by adding additional information from newly issued cards or removing information from discontinued cards.

It would be advantageous, therefore, to devise a method and apparatus for consolidating the various cards, and other types of information, which individuals typically carry in a wallet or purse. It would further be advantageous if such a method and apparatus stored the information in a central location and facilitated the use of a single multi-purpose card. It would still further be advantageous if such a method and apparatus allowed the user of the method and apparatus the ability to control the stored information.

SUMMARY OF THE INVENTION

In view of the foregoing, embodiments of the present invention advantageously provide a wireless device or apparatus, also known as a wallet consolidator, capable of warehousing digitized information stored on the cards including identification information, some or all of which to be delivered to a computer device and possibly a portion to the device operator located with the computer device. According to an embodiment of the present invention, a wallet consolidator can include, for example, a controller to control operation of the wallet consolidator, at least one input device connected to the controller of the wallet consolidator to receive a copy of identification information stored on at least one card, a memory connected to the controller to store the information received by the input device, and an output device connected to the controller and positioned to transmit at least a portion of the information stored in the memory device to computer device, e.g., point-of-sale terminal, dumb terminal, and/or database, located at a point-of-sale, which is positioned to process a point-of-sale transaction effectuated pursuant to the at least a portion of the information.

According to an embodiment of the wallet consolidator, in its most generalized configuration, the input device can include, but is not limited to, one or more of the following: a magnetic stripe card reader, a bar code reader, a keypad, a touch screen, a smart card reader, a kiosk, a memory card, a telephony interface, a wireless interface, a wireline communications interface, a wireless communications interface, an infrared (IR) interface, and a radio frequency (RF) interface. The memory device can include, but is not limited to, one or more of the following: semiconductor memory, a smart card (contact, contactless, or hybrid), a memory card (portable flash memory), random access memory (RAM), magnetic memory, or a hard disk magnetic tape, an optical memory device, and an optical disc. The output device can include, but is not limited to, one or more of the following: a data interface, a telephony interface, a wireless interface, a wireline communications interface, a wireless communications interface, a radio frequency (RF) interface, an infrared (IR) interface, and a display configured for displaying scannable bar codes.

To store information in the wallet consolidator, for example, or alternatively in a smart card interfaced to the wallet consolidator, information can be read from magnetic stripes on various types of cards such as, but not limited to, credit, debit and identification cards. A bar code scanner allows a bar code to be scanned from a card and stored in memory. Additionally, images of the cards including, but not limited to, signatures, portraits can be downloaded, and with sufficient memory, stored for future use. A user can retrieve information using the input device for use in an, e.g., point of sale transaction. The stored images can be retrieved and displayed on a display screen including a bar code which can be scanned by a bar code scanner.

According to another embodiment of a wallet consolidator, the wallet consolidator can include an input device positioned to receive information stored on at least one card, a memory device connected to the input device to store the information received by the input device, and an output device connected to the memory device and positioned to transmit at least a portion of the information stored in the memory device to a point-of-sale terminal located at a point-of-sale. The point-of-sale terminal can be positioned to process a transaction responsive to the at least a portion of the information. The information can include, for example, account identification information pertaining to at least one of the following: one or more credit cards, one or more debit cards, one or more identification cards, one or more electronic coupons, or one or more food stamp accounts. Accordingly, the at least one card can include one or more credit cards, one or more debit cards, one or more identification cards, one or more electronic coupons, or one or more food stamp identification cards. The information can also include driver's license data taken from, for example, a driver's license card. Further, the information can include a digitized image of the at least one card, to thereby provide further functionality. Advantageously, the output device can include a wireless output device such as, for example, a wireless interface, a wireless communications interface, or a radio frequency (RF) interface, to thereby enhance personal mobility.

Another embodiment of the present invention can include a wallet consolidator including a controller positioned to control operation of the wallet consolidator, an input device in communication with the controller and positioned to receive a copy of identification information stored on at least one card, a memory device in communication with the controller and positioned to store the identification information received by the input device, and an output device in communication with the controller and positioned to transmit at least a portion of the identification information stored in the memory device to a point-of-sale terminal located at a point-of-sale. The point-of-sale terminal can be positioned to process a point-of-sale transaction responsive to the at least a portion of the identification information. According to an embodiment of the wallet consolidator, the information can include personal identification information contained on the at least one card, and the output device can include a wireless output device such as, for example, a wireless interface, a wireless communications interface, or a radio frequency (RF) interface, to thereby enhance personal mobility.

According to another embodiment of a wallet consolidator, the wallet consolidator can include an input device positioned to receive information stored on at least one card, a memory device connected to the input device to store the information received by the input device, and a wireless output device connected to the memory device and positioned to transmit at least a portion of the information stored in the memory device to a point-of-sale terminal located at a point-of-sale. The point-of-sale terminal can be positioned to process a transaction responsive to the at least a portion of the information.

According to another embodiment of the wallet consolidator, the wallet consolidator can include a controller position to control operation of the wallet consolidator, an input device in communication with the controller and positioned to receive information contained on at least one card, a memory device in communication with the controller and positioned to store the information received by the input device, and a wireless output device in communication with the controller and positioned to interface with a point-of-sale terminal located at a point-of-sale to provide at least a portion of the information stored in the memory device to the point-of-sale terminal. The point-of-sale terminal can be positioned to enable a transaction responsive to receiving the at least a portion of the information.

Embodiments of the present invention also include a method for processing a transaction using a wallet consolidator. For example, such a method can include the steps of receiving information stored on at least one of a plurality of cards, storing the received information in a memory device, and transmitting at least a portion of the stored information to a point-of-sale terminal positioned at a point-of-sale and positioned to process a respective point-of-sale transaction responsive to the at least a portion of the information.

BRIEF DESCRIPTION OF THE DRAWINGS

A more complete understanding of the present invention may be had by reference to the following Detailed Description and appended claims, when taken in conjunction with the accompanying Drawings wherein:

DETAILED DESCRIPTION

Figure 1:
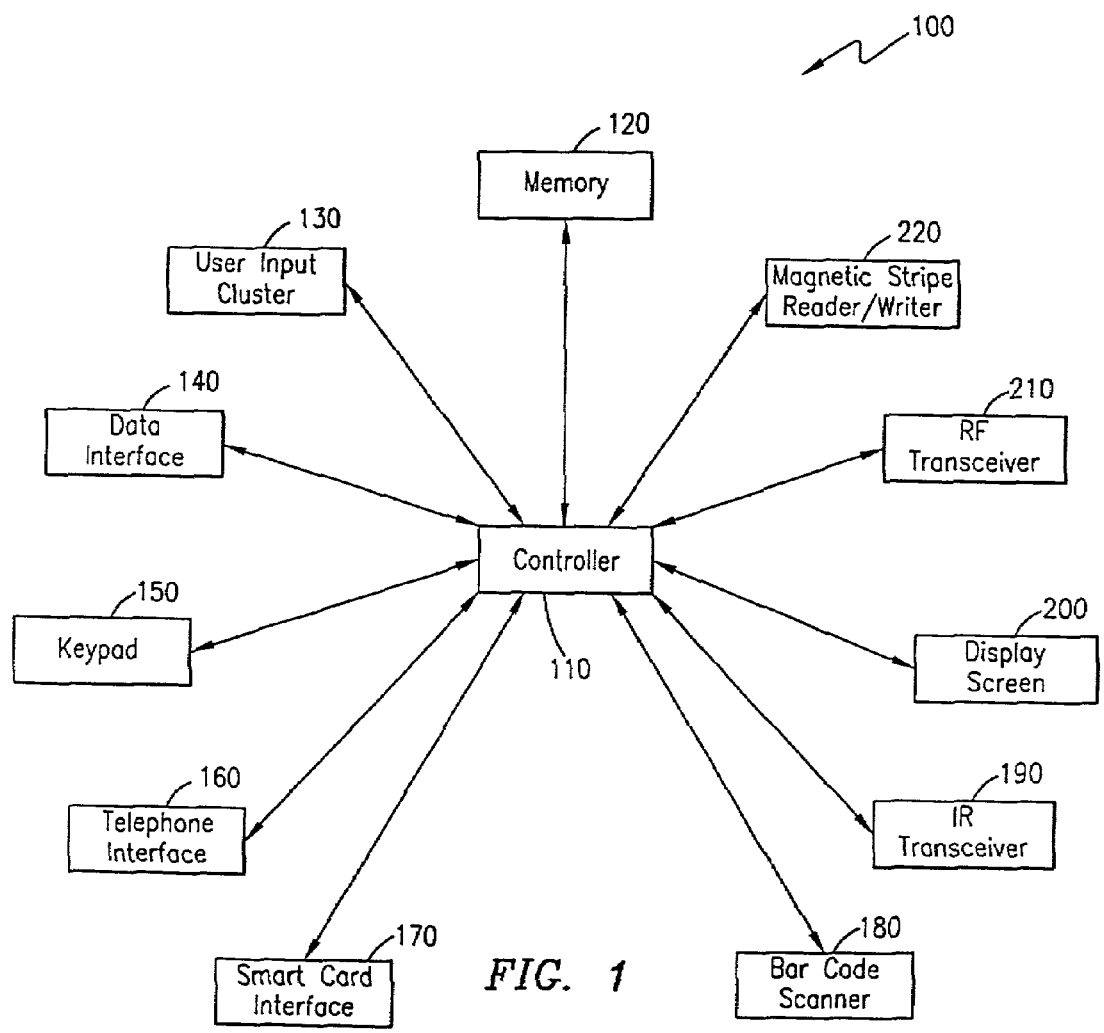
FIG. 1 is a functional block diagram of the wallet consolidator.

Referring now to FIG. 1, there is illustrated a functional block diagram of a wallet consolidator shown generally at 100. The functional components of the wallet consolidator 100 include a controller 110, a memory 120, a user input cluster 130, a data interface 140, a keypad 150, a telephone interface 160, a smart card interface 170, a bar code scanner 180, an infrared (IR) transceiver 190, a display screen 200, a radio frequency (RF) transceiver 210 and a magnetic stripe reader/writer 220.

The controller 110, controls the overall operation of the wallet consolidator 100 including the coordination of the various functional blocks. The magnetic stripe reader/writer 220 is used to read and write information from and to magnetic stripes used on credit cards, debit cards and identification cards among others. Information read from the magnetic stripes by the magnetic stripe reader/writer 220 is stored in the memory 120 of the wallet consolidator 100. In an alternative embodiment, the information is stored in a memory located within a smart card which is commonly known in the industry. In situations where the information from the magnetic stripe is stored in the memory of the smart card, the information is written into the memory of the smart card using the smart card interface 170. The smart card interface 170 effectuates reading and writing from and to the smart card.

A keypad 150, is used as a user input for inputting information or indicating selections and actions to the wallet consolidator 100. In the preferred embodiment of the present invention, the keypad 150 is a numeric keypad, however; in an alternative embodiment the keypad 150 is an alphanumeric keypad. The user input cluster 130 provides an additional user input for communicating selections and actions to the wallet consolidator 100. While it is understood that the user input cluster 130 can have any number of input buttons, the preferred embodiment of the present invention includes an up and a down button for moving through options provided to the user on the display screen 200, a delete button for removing items from the display screen and an activate button for making a selection and/or enabling an action by the wallet consolidator 100.

The bar code scanner 180 allows a user to scan a bar code on the face of identification, credit, debit and other types of cards and to store the bar code in the memory 120 of the wallet consolidator, or alternatively, in the memory of the smart card. In either event, the user can select the bar code for display on the display screen 200 such that the bar code, as displayed on the display screen 200, is readable by a bar code scanner.

In addition to displaying items stored in the memory 120 of the wallet consolidator 100, or alternatively the memory of the smart card, the display screen 200 is used for programming and/or otherwise controlling operation of the wallet consolidator 100. For example, the display screen 200, in conjunction with the keypad 150 and/or the user input cluster 130, is used by the user to input a passcode to gain access to the wallet consolidator 100. In an alternative embodiment, the keypad 150 is effectuated using a touch sensitive display screen 200. After gaining access to the wallet consolidator 100, the controller 110 displays a menu of functions on the display screen 200 and the user makes a selection by either using the user input cluster 130 to scroll through and select an option or directly selecting an option using the keypad 150. The types of options include, but are not limited to, selecting a card to add or delete, duplicating information, transferring data, moving cash or accessing various types of information such as electronic coupons, identification information or medical records among others. Based on the selected option, the wallet consolidator 100, via the display screen 200 traverses an action tree which instructs the user on the use of the wallet consolidator 100.

The data interface 140 and telephone interface 160 effectuate communication between the wallet consolidator 100 and various computing devices such as, but not limited to, point of sale terminals, dumb terminals and databases. The data interface 140 uses a serial data port, a parallel data port or any other data communication technique. In a similar fashion, the telephone interface 160 allows communication via a wireline or wireless telecommunication network. Furthermore, the infrared transceiver 190 and the radio frequency transceiver 210 effectuate wireless communication between the wallet consolidator 100 and various computing devices such as, but not limited to, point of sale terminals, dumb terminals and databases, which are equipped with a similar infrared transceiver or radio frequency transceiver.

The wallet consolidator 100 allows an individual to swipe their credit, debit, identification or other type cards through the magnet stripe reader/writer 220 and store the information contained in the magnetic stripe in the memory 120 of the wallet consolidator 100, or alternatively in the memory of the smart card. The wallet consolidator 100 also allows an individual to scan a bar code on a card using the bar code scanner 180 and store the bar code in the wallet consolidator 100, or alternatively in the memory of the smart card. Furthermore, the individual can download the image of the cards, or other cards which do not have a magnetic stripe and, with sufficient memory, store a digitized image in the memory 120 of the wallet consolidator 100, or alternatively in the memory of the smart card. Additionally, other types of information can be stored in either the memory 120 of the wallet consolidator 100 or the memory of the smart card. Among other types of information, items such as electronic coupons or food stamp balances can be stored and then redeemed during a point of sale transaction. Communication with various computing devices such as, but not limited to, point of sale terminals, dumb terminals and databases, can be effectuated using the telephone interface 160, the radio frequency transceiver 210, the infrared transceiver 190 or the display screen 200.

Figure 2:
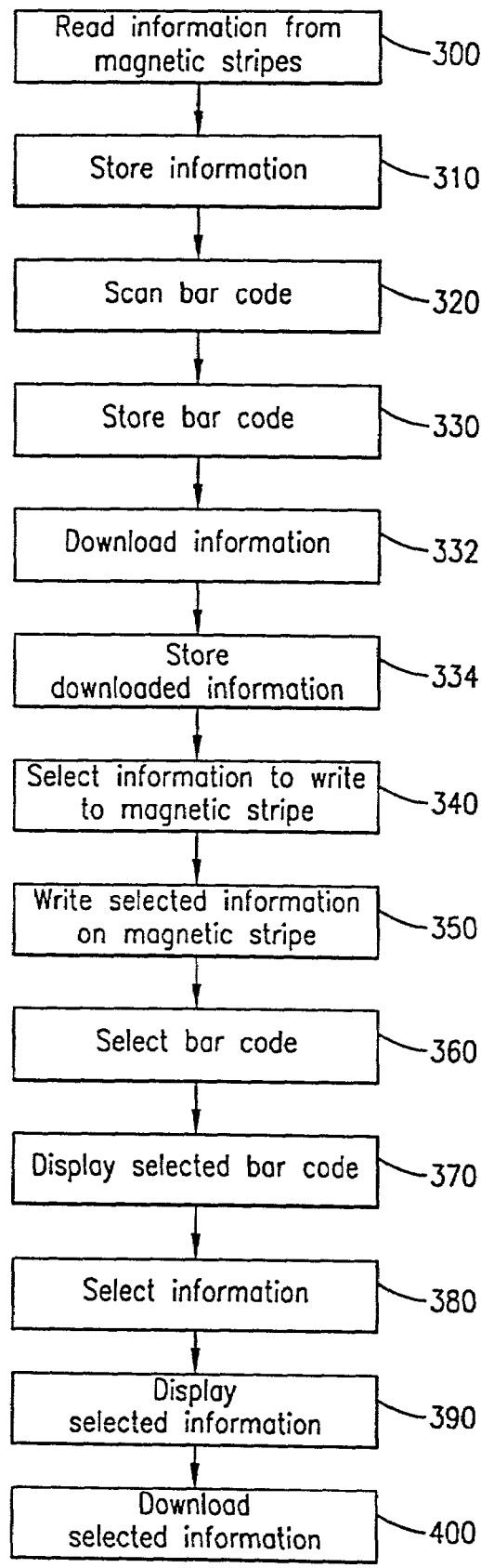
FIG. 2 is a flow diagram of a preferred method for consolidating card information using the wallet consolidator described in FIG. 1.

Referring additionally now to FIG. 2, there is illustrated a flow diagram of a preferred method for consolidating card information using the wallet consolidator 100 described in FIG. 1. Information stored on magnetic stripes is entered into the wallet consolidator 100 by swiping the subject identification, credit, debit or other type of card through the magnetic stripe reader/writer 220 to read the information from the magnetic stripe of the subject card (step 300). Alternatively, the information can be entered into the wallet consolidator 100 via the data interface 140, the keypad 150, the telephone interface 160, the infrared transceiver 190 or the radio frequency transceiver 210. The entered information is stored in the memory 120 of the wallet consolidator 100, or alternatively in the memory of the smart card (step 310).

Similarly, bar codes from the cards are scanned (step 320) and the bar codes are stored in the memory 120 of the wallet consolidator 100, or alternatively, in the memory of the smart card (step 330). Alternatively, the information can be entered into the wallet consolidator 100 via the data interface 140, the keypad 150, the telephone interface 160, the infrared transceiver 190 or the radio frequency transceiver 210.

Still further, other information such as electronic coupons or images such as portraits and signatures, are downloaded into the wallet consolidator 100 (step 332) and stored in the memory 120 of the wallet consolidator 100, or alternatively, in the memory of the smart card (step 334). The information can be downloaded into the wallet consolidator 100 via the data interface 140, the keypad 150, the telephone interface 160, the infrared transceiver 190 or the radio frequency transceiver 210.

To retrieve magnetic stripe information from the wallet consolidator 100, the user selects the desired information using either the user input cluster 130 or the keypad 150 (step 340). Once the information has been selected, the information can be written onto a magnetic strip of the smart card or other multi-use card (step 350). Alternatively, the information which was selected can be communicated to various computing devices such as, but not limited to, point of sale terminals, dumb terminals and databases via the data interface 140, the telephone interface 160, the infrared transceiver 190 or the radio frequency transceiver 210.

Similarly, the user selects a desired bar code using either the user input cluster 130 or the keypad 150 (step 360) and the selected image is displayed on the display screen 200 (step 370). Alternatively, the information which was selected can be communicated to various computing devices such as, but not limited to, point of sale terminals, dumb terminals and databases via the data interface 140, the telephone interface 160, the infrared transceiver 190 or the radio frequency transceiver 210.

Still further, the user can select stored information, including downloaded information, (step 380) and display the selected information (step 390) or download the selected information (step 400) to various computing devices such as, but not limited to, point of sale terminals, dumb terminals and databases via the data interface 140, the telephone interface 160, the infrared transceiver 190 or the radio frequency transceiver 210.

Figure 3:
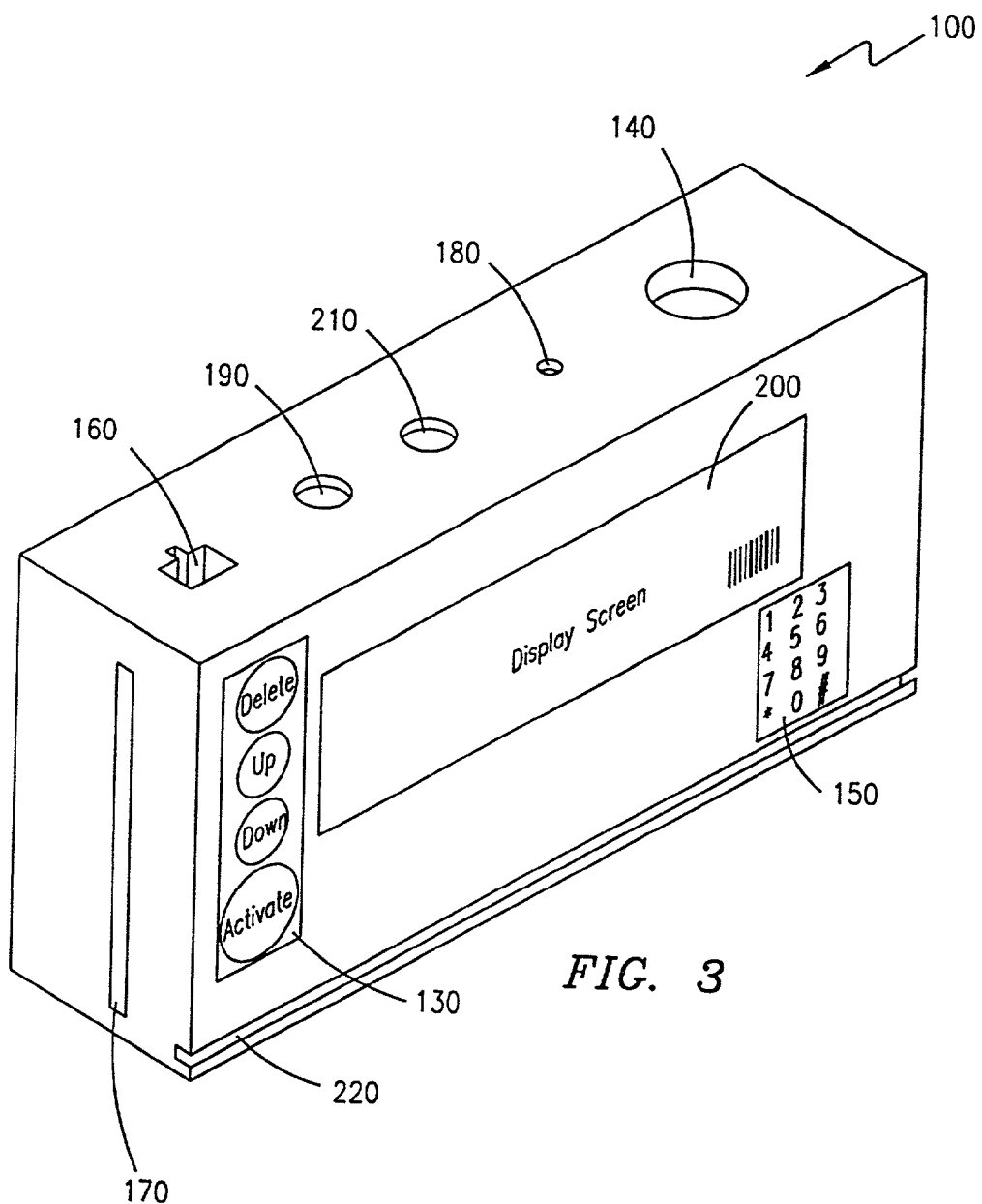
FIG. 3 is a perspective view of a wallet consolidator consistent with a preferred embodiment of the present invention.

Referring now to FIG. 3, there is illustrated a perspective view of a wallet consolidator 100. The wallet consolidator, shown generally at 100, includes the controller 110 which is located internally and not shown, the memory 120 also located internally and not shown, the user input cluster 130, the data interface 140, the keypad 150, the telephone interface 160, the smart card interface 170, the bar code scanner 180, the infrared transceiver 190, the display screen 200, the radio frequency transceiver 210 and the magnetic stripe reader/writer 220.

Although the preferred embodiments of the apparatus and method of the present invention have been illustrated in the accompanying drawings and described in the foregoing detailed description, it is understood that the invention is not limited to the embodiments disclosed, but is capable of numerous rearrangements, modifications and substitutions without departing from the spirit of the invention as set forth and defined by the following claims.

What is claimed is:

1. A wallet consolidator, comprising:
    a controller to control operation of a wallet consolidator;
    at least one input device connected to said controller of the wallet consolidator and positioned to receive a copy of information stored on at least one card;
    a memory device connected to said controller to store said information received by said input device; and
    an output device connected to said controller and positioned to effectuate communication of at least a portion of said information stored in said memory device to a point-of-sale terminal located at a point-of-sale when the point-of-sale terminal is positioned receive said at least a portion of said information from the output device of the wallet consolidator for use in a point-of-sale transaction.

2. A wallet consolidator as defined in claim 1, wherein said information comprises information pertaining to at least one of the following: one or more credit cards, one or more debit cards, one or more identification cards, one or more electronic coupons, or one or more food stamp accounts.

3. A wallet consolidator as defined in claim 2, wherein said output device is a wireless communication device.

4. A wallet consolidator claim 1, wherein said input device comprises at least one of the following: a touch screen, a smart card reader, a kiosk, a memory card, or a radio frequency (RF) interface.

5. A wallet consolidator as defined in claim 1, wherein said controller controls instructions to be presented to a user to instruct the user on use of the wallet consolidator.

6. A wallet consolidator as defined in claim 1, further comprising a display positioned to display scannable bar code patterns capable of being scanned by a bar code scanner.

7. A wallet consolidator as defined in claim 1, wherein said output device is further positioned to transmit at least a portion of said information stored in said memory device to a computing device selected from the group of: a dumb terminal, or a database, and is positioned to receive information transmitted from said output device.

8. A wallet consolidator as defined in claim 1, wherein said information includes identification information pertaining to one or more of the following: credit cards, debit cards, identification cards, electronic coupons, or food stamp accounts.

9. A wallet consolidator as defined in claim 8, wherein said output device is a wireless radio frequency (RF) communication device.

10. A wallet consolidator as defined in claim 1, further comprising at least one of the following: a touch screen or a user input cluster connected to said controller, positioned to receive input for controlling said output device.

11. A wallet consolidator as defined in claim 1, further comprising a writer connected to said controller and positioned to write said information to a personalized smart card.

12. A wallet consolidator as defined in claim 1,
    wherein said input device comprises at least one of the following: a touch screen, a smart card reader, a kiosk, a memory card, a telephony interface, a wireless interface, a wireline communications interface, a wireless communications interface, an infrared (IR) interface, or a radio frequency (RF) interface;
    wherein said output device comprises at least one of the following: a wireless interface, a wireless communications interface, or a radio frequency (RF) interface; and
    wherein said output device is further positioned to transmit at least a portion of said information stored in said memory device to a computing device is selected from the group of: a dumb terminal, and a database positioned to receive information from said output device.

13. A wallet consolidator as defined in claim 1, further comprising a writer connected to said controller and positioned to write said information to a personalized transaction card, said information including personal identification information contained on at least one of a plurality of cards.

14. A method for processing a transaction using a wallet consolidator, the method comprising the steps of:
    receiving information stored on at least one of a plurality of cards;
    storing said received information in a memory device; and
    communicating at least a portion of said stored information to a point-of-sale terminal positioned at a point-of-sale and positioned to process a point-of-sale transaction responsive to said at least a portion of said information.

15. A method as defined in claim 14,
    wherein said information comprises information pertaining to at least one of the following: one or more credit cards, one or more debit cards, one or more identification cards, one or more electronic coupons, or one or more food stamp accounts; and
    wherein the method further comprises the steps of:
        providing a user an option to select a card to add or delete, duplicate information, transfer data, move cash, or access or amend information including at least one of the following: an electronic coupon, personal identification information, or a medical record, and
        traversing an action tree which instructs the user on the use of the wallet consolidator responsive to the selected option.

16. A method as defined in claim 14,
    wherein the step of receiving is performed via an input device comprising at least one of the following: a touch screen, a smart card reader, a kiosk, a memory card, or a radio frequency (RF) interface; and
    wherein the method further comprises the step of receiving a passcode from a user prior to allowing the user to gain access to the wallet consolidator.

17. A method as defined in claim 14, wherein the memory device comprises at least one of the following: semiconductor memory, random access memory (RAM), magnetic memory, or a hard disk.

18. A method as defined in claim 14, wherein the step of communicating is performed via an output device comprising one or more of the following: a wireless communications interface or a radio frequency (RF) interface, and wherein the method further includes using the at least a portion of the information for a point-of-sale transaction.

19. A method as defined in claim 14,
    wherein the method further comprises transmitting at least a portion of said stored information to a computing device selected from the group of: a dumb terminal and a database; and
    wherein the received information includes a digitized image of the at least one of a plurality of cards.

20. A method as defined in claim 14, wherein said information comprises identification information pertaining to at least one of the following: one or more credit cards, one or more debit cards, one or more identification cards, one or more electronic coupons, or one or more food stamp accounts;

wherein the method further comprises transmitting at least a portion of said stored identification information to a computing device selected from the group of: a dumb terminal and a database;

wherein the step of communicating identification receiving is performed via an input device connected to a controller, the input device comprising at least one of the following: a magnetic stripe card reader, a bar code reader, a keypad, a touch screen, a smart card reader, a kiosk, a memory card, a telephony interface, a wireless interface, a wireline communications interface, a wireless communications interface, an infrared (IR) interface, or a radio frequency (RF) interface;

wherein the step of storing is performed via a memory device connected to said controller, the memory device comprising at least one of the following: a semiconductor memory, a smart card, a memory card, random access memory (RAM), magnetic memory, hard disks, magnetic tapes, an optical memory device, or an optical disc;

wherein the step of communicating identification information to the point-of-sale terminal is performed via an output device connected to said controller, the output device comprising at least one of the following: a wireless interface, a wireless communications interface, or a radio frequency (RF) interface.

21. A method as defined in claim 14, further comprising at least one of the following: a touch screen or a user input cluster, connected to said output device and positioned to receive input to control said output device.

22. A method as defined in claim 14, further comprising a writer connected to the memory device to write said at least a portion of said information to a personalized transaction card, said information including identification information contained on a plurality of cards.

23. A method as defined in claim 14, wherein the memory device comprises at least one of the following: a smart card, a memory card, a magnetic tape, an optical memory device, or an optical disc.

24. A wallet consolidator comprising:
   a controller positioned to control operation of the wallet consolidator;
   an input device in communication with the controller and positioned to receive a copy of information stored on at least one card;
   a memory device in communication with the controller and positioned to store the information received by the input device; and
   an output device in communication with the controller to effectuate communication of at least a portion of said information stored in said memory device to a point-of-sale terminal located at a point-of-sale when the point-of-sale terminal is positioned to receive said at least a portion of said information from the output device of the wallet consolidator for use in a point-of-sale transaction.

25. A wallet consolidator as defined in claim 24, wherein the information includes identification information contained on at least one of a plurality of cards.

26. A wallet consolidator as defined in claim 25, wherein the output device is a wireless radio frequency (RF) communication device.

27. A wallet consolidator comprising:
   a controller positioned to control operation of the wallet consolidator;
   an input device in communication with the controller and positioned to receive information contained on at least one card;
   a memory device in communication with the controller and positioned to store the information received by the input device; and
   a wireless output device in communication with the controller and adapted to be positioned to interface with a point-of-sale terminal located at a point-of-sale to provide at least a portion of the information stored in the memory device to the point-of-sale terminal when the point-of-sale terminal is positioned to enable a point-of-sale transaction responsive to receiving the at least a portion of the information.

28. A wallet consolidator as defined in claim 27, wherein the at least one card includes a driver's license card.

29. A wallet consolidator as defined in claim 27, wherein the received information includes a digitized image.

30. A wallet consolidator as defined in claim 27, wherein the wireless output device is a wireless radio frequency (RF) communication device operatively positioned to interface directly with the point-of-sale terminal positioned at the point-of-sale location.

31. A wallet consolidator comprising:
   an input device positioned to receive information stored on at least one card;
   a memory device connected to the input device to store the information received by the input device; and
   a wireless output device connected to the memory device and positioned to effectuate communication of at least a portion of said information stored in said memory device to a point-of-sale terminal located at a point-of-sale when the point-of-sale terminal is positioned to receive said at least a portion of said information from the wallet consolidator for use in a point-of-sale transaction.

32. A wallet consolidator as defined in claim 31, wherein the information comprises account identification information pertaining to at least one of the following: one or more credit cards, one or more debit cards, one or more identification cards, one or more electronic coupons, or one or more food stamp accounts.

33. A wallet consolidator as defined in claim 31, wherein the at least one card includes a driver's license card.

34. A wallet consolidator as defined in claim 31, wherein the received information includes a digitized image.

35. A wallet consolidator as defined in claim 31, wherein the output device comprises at least one of the following: a wireless interface, a wireless communications interface, or a radio frequency (RF) interface.

* * * * *

UNITED STATES PATENT AND TRADEMARK OFFICE
CERTIFICATE OF CORRECTION

PATENT NO. : 7,349,885 B2
APPLICATION NO. : 09/923617
DATED : March 25, 2008
INVENTOR(S) : Frank J. Gangi It is certified that error appears in the above-identified patent and that said Letters Patent is hereby corrected as shown below:

Title Page, Item (57) Abstract: Line 10, after "memory" insert --device--.

Column 1, line 40, delete "allow" and insert --allows--.

Column 2, line 8, after "memory" insert --device--; line 29, delete "or", and after "hard disk" insert --,--; line 44, after "signatures" delete "," and insert --and--; after "portraits" insert --,--; lines 47-48, delete "point of sale" and insert --point-of-sale--.

Column 4, lines 4-5, delete "Detailed Description" and insert --detailed description--; line 6, delete "Drawings" and insert --drawings--; line 43, delete ","; line 47, after "embodiment" insert --,--; line 55, after "screen" insert --,--; line 67, after "alternatively" insert --,--.

Column 5, line 10, after "200" insert --,--; line 17, after "records" insert --,--; line 20, after "200" insert --,--; lines 24, 32, 53 and 55 delete "point of sale" and insert --point-of-sale--; lines 39, 43, and 47, delete "alternatively" insert --,--.

Column 6, line 5, after "alternatively" insert --,--; lines 31-32, 40, and 48, delete "point of sale" and insert --point-of-sale--.

UNITED STATES PATENT AND TRADEMARK OFFICE
CERTIFICATE OF CORRECTION

PATENT NO.         : 7,349,885 B2
APPLICATION NO. : 09/923617
DATED              : March 25, 2008
INVENTOR(S)        : Frank J. Gangi It is certified that error appears in the above-identified patent and that said Letters Patent is hereby corrected as shown below:

In the Claims:

Column 7, line 15 (claim 1, line 12), after "positioned" insert --to--; line 26, (claim 4, line 1), after "A wallet consolidator" insert --as defined in--; and line 41, (claim 7, line 5), delete ", or" and "and is", and after "terminal" insert --and--.

Column 8, line 4 (claim 12, line 14), delete "is"; line 4 delete ", and" after "database" insert --,--.

Column 9, line 5 (claim 20, line 11), delete "communicating indentification"; line 27, (claim 21, line 1), delete "further" and insert --wherein the step of receiving is performed via an input device--; line 29, (claim 21, line 3), delete "said" and insert --an--; and lines 31-32, (claim 22, lines 1-2), delete "further comprising a writer" and insert --wherein the step of storing is performed via a--.

Signed and Sealed this

Thirtieth Day of December, 2008

JON W. DUDAS
*Director of the United States Patent and Trademark Office*